Jan. 13, 1970  J. T. MERDIAN ET AL  3,489,401
GLASS TANK STRUCTURE
Filed June 10, 1968

INVENTORS.
JOHN TERRY MERDIAN
GEORGE E. BRINKERHOFF
BY
Raymond H. Majesko
ATTORNEY

United States Patent Office 3,489,401
Patented Jan. 13, 1970

3,489,401
GLASS TANK STRUCTURE
John T. Merdian, Pittsburgh, and George E. Brinkerhoff, Bethel Park, Pa., assignors to Dresser Industries, Inc., Dallas, Tex., a corporation of Delaware
Filed June 10, 1968, Ser. No. 735,858
Int. Cl. F27d 1/00
U.S. Cl. 263—46      5 Claims

ABSTRACT OF THE DISCLOSURE

This invention relates to glass melting furnace regenerative rider arches and fill brick in which the supporting mechanism therefor contains pressed sheet segments of asbestos fibers to compensate for the thermal expansion of the refractory.

---

The ever increasing progress in glassmaking practice has brought about greatly increased production of glass per square foot of melting area and per cubic foot of glass tank furnace volume. The severity of operating conditions which glass tank refractories are required to withstand continues to become greater as the push toward higher production continues. Much higher temperatures are employed, and the amount and corrosiveness of the batch carryover and volatile fluxes have increased.

The selection of optimal refractories for a glass tank would give the longest and most balanced life through all parts of the furnace. By balanced life, it is meant that all parts last about the same length of time. This requires special attention to the various positions where short service life might cause shutdown for repairs long before a complete rebuilt of the glass tank is necessary.

For a long period of time the regenerators of glass tanks have been the limiting factor in glass tank service life. Within the regenerator, the checker setting has always received the most severe service from wide temperature cycling, oxidation-reduction effects as well as solid carry-over or alkali condensate attack. The rider arches, tile and fill brick receive severe service in their support function for the entire checker setting. One move to improve the service life of glass tank regenerators has been to replace super duty fireclay and high alumina in supporting arches, tile and fill brick and checkers with basic brick. Basic brick are those which are made from batches containing dead burned magnesite, chrome ore, olivine, etc. These have better chemical resistance to glass tank carryover. Transition to basic brick has not been altogether satisfactory, however, as the basic brick have a higher degree of thermal expansion and this becomes important in the rider arches and fill brick which are supported by the regenerator sidewalls. At elevated temperatures, the expansion of these bricks can cause stress against the sidewalls and ultimate damage.

It is therefore an object of this invention to provide a regenerative-type glass tank structure which will enjoy the longer service life available by using basic brick in at least the rider arch and fill brick and compensating for the expansion of these brick at the support structure.

It is another object of this invention to provide a glass tank regenerator structure comprising basic refractory brick which will have a longer and more uniform service life.

Figure 1:
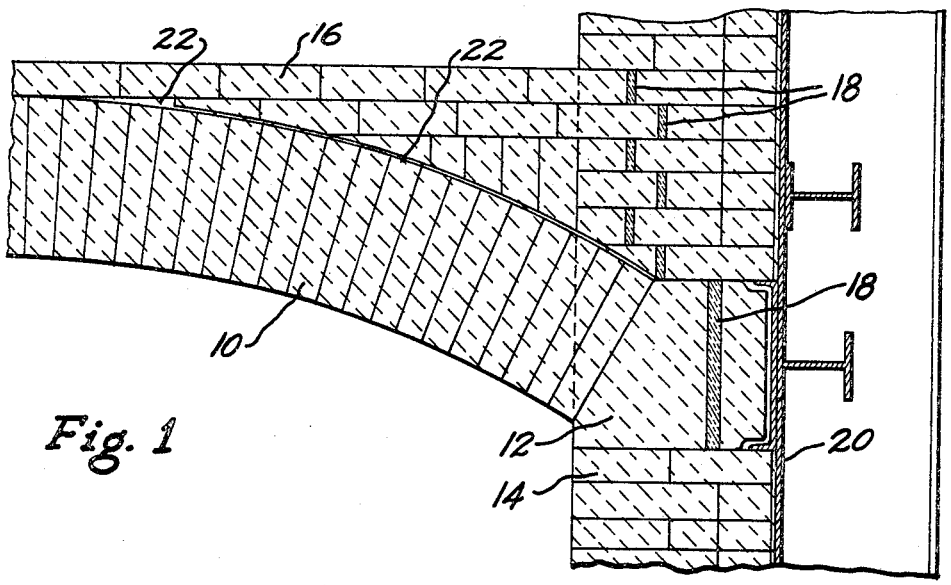
Figure 2:
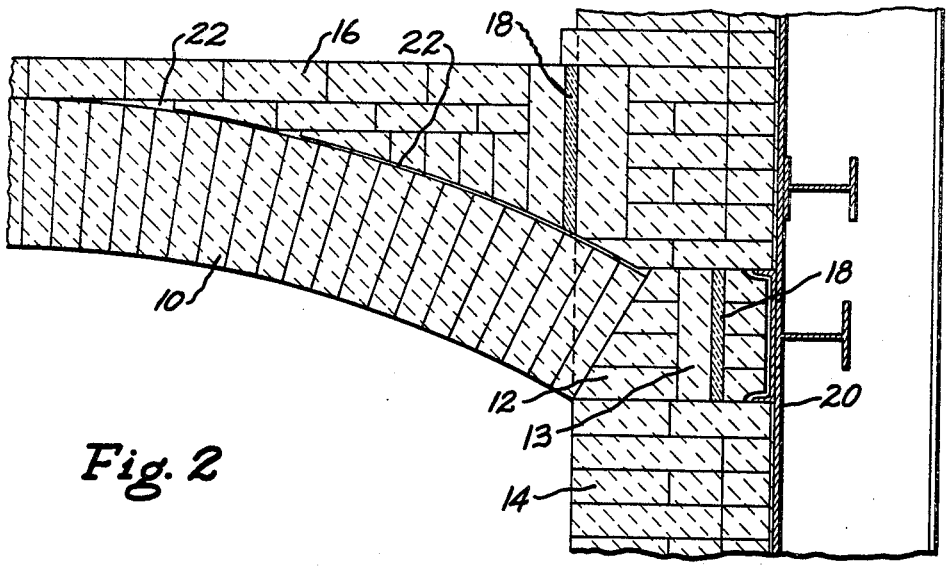

The objects and advantages of this invention are more easily understood by a reference to the drawing, FIGURES 1 and 2 which are schematic section views of the lower portion of a glass tank regenerator. It should be pointed out that the drawing is only exemplary of the type of regenerator structure referred to in this specification and not intended to be limiting.

Briefly, a glass tank regenerator contains at least one regenerator chamber defined by an upper crown and interconnecting sidewalls. The chamber contains rider arches at the lower end thereof which spans opposing sidewalls and is supported on skew brick. There are a plurality of fill brick thereabove which are supported, in part, by the sidewalls. Above the fill brick are the rider tile which support the checker setting. Between the skew brick and sidewalls and between the terminus of the fill brick and sidewalls are disposed pressed sheet segments of asbestos fibers to compensate for the thermal expansion of the refractory brick without deterioration thereof. The asbestos sheet may also be disposed between the rider arch and fill brick, if desired.

The asbestos sheet employed in the present invention is generally produced by compressing, at a high pressure, a batch of randomly oriented asbestos fibers to a self-sustaining integral thickness of from about ⅛ to ¼″. Preferred asbestos sheet is characterized as having a density of about 60 p.c.f., a service temperature of from about 100 to 2000° F. and a coefficient of thermal conductivity of about 0.8 to 1.5 B.t.u./hr./sq. ft./° F./in. thickness.

The rider arch and fill brick are suitably composed of magnesite-chrome ore or chrome ore-magnesite brick. Preferably, the brick analyze between about 50% and 80% chrome ore and the balance magnesite.

Suitable chrome-magnesite refractory shapes are disclosed and claimed in United States Patent Nos. 3,180,743 and 3,180,744 to Davies and Walther, which are directed in part, to direct bonded chrome-magnetise brick. Other chrome-magnesite refractory brick are disclosed and claimed in copending application Patent No. 3,316,017 to Havranek. An examplary composition is one containing from 80 to 60 parts, by weight, of chrome ore (such as Philippine chrome ore and concentrates, Transvaal chrome ore, Turkish chrome ore, etc.) and 20 to 40 parts, by weight, of dead burned magnesia.

All of the above patents are assigned to the assignee of the present invention.

Referring to FIGS. 1 and 2, there are shown portions of the regenerative structures of glass melting furnaces. These structures are intended as typical and not limitations of the present invention. The rider arch is indicated at 10 and is fabricated from a plurality of refractory shapes. There are several of such arches in each regenerator structure in support of the checker construction. The arches are supported on skew-backs 12. In FIG. 1, the skewbacks are composed of a single shape while in FIG. 2 there are several skew end shapes braced against a vertical shape 13. All of the arches span the sidewalls 14 as these are the sole supporting mechanism therefor.

Above the rider arch are a plurality of fill brick 16. These shapes fill in the void created by sloping arches and horizontal of rider tile (not shown). The fill brick courses are supported, in part, by the sidewalls. At the junctions of the skewback 12 and fill brick 16 with the sidewalls 14 (which are supported by a metal shell 20), there are disposed pressed sheet segments of asbestos fibers 18. As shown in FIGS. 1 and 2, the junction of the terminal fill brick and the sidewalls may be provided in various ways. FIG. 1 shows an interlocking dovetail type of junction for greater structural integrity. FIG. 2 is indicative of the normal flat surface to flat surface abutment of shapes at this junction.

In addition, if desired, asbestos sheet may be employed at 22, between the rider arch and fill brick to compensate for thermal expansion therebetween.

In practice, at about 2000° F., approximately 25% of the thermal expansion of the basic brick of the type described previously, is compensated or absorbed by the mortar joints. To compensate for the balance of the expansion, about ⅜" thickness of asbestos sheet is required at the areas indicated. The actual thickness of asbestos sheet employed at given installations will, of course, depend on the operating temperature of the furnace.

Having thus described the invention in detail and with sufficient particularity as to enable those skilled in the art to practice it, what is desired to have protected by Letters Patent is set forth in the following claims.

We claim:
1. In a glass melting furnace containing at least one regenerator chamber defined by an upper crown and interconnecting sidewalls, said chamber containing rider arches at the lower end thereof which span opposing sidewalls and is supported on skewbrick, there being a plurality of fill brick thereabove which are supported, in part, by the sidewalls, the improvement comprising, pressed sheet segments of asbestos fibers being disposed between the fill brick and sidewalls and between the skewbrick and sidewalls, said sheets compensating for the thermal expansion of the refractory brick without deterioration thereof.

2. A furnace according to claim 1 in which the asbestos sheets are also disposed between the rider arches and fill brick.

3. A furnace according to claim 1 in which the asbestos sheets have a thickness of between about ⅛" and ¼" and a coefficient of thermal conductivity between about 0.8 and 1.5 B.t.u./hr./sq. ft./° F.-inch thickness.

4. A furnace according to claim 1 in which the rider arch and fill brick are composed of magnesite-chrome ore and chrome ore-magnesite brick.

5. A furnace according to claim 4 in which said brick analyze between about 50% and 80% chrome ore and the balance magnesite.

References Cited

UNITED STATES PATENTS

| | | | |
|---|---|---|---|
| 1,678,816 | 7/1928 | Kinahan | 110—99 |
| 1,883,983 | 10/1932 | Lanyon | 110—99 |
| 1,919,412 | 7/1933 | Brown et al. | 263—46 |
| 3,315,950 | 4/1967 | Potocnik et al. | 263—46 |
| 3,346,248 | 10/1967 | Martinet et al. | 110—99 |

JOHN J. CAMBY, Primary Examiner

U.S. Cl. X.R.

110—99